United States Patent
Xu et al.

(10) Patent No.: US 12,026,964 B2
(45) Date of Patent: Jul. 2, 2024

(54) PLANT BLOOMING PERIOD BROADCAST METHOD AND SYSTEM, AND COMPUTER-READABLE STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 413 days.

(21) Appl. No.: 17/629,413

(22) PCT Filed: Feb. 2, 2021

(86) PCT No.: PCT/CN2021/074752
§ 371 (c)(1),
(2) Date: Jan. 24, 2022

(87) PCT Pub. No.: WO2021/159990
PCT Pub. Date: Aug. 19, 2021

(65) Prior Publication Data
US 2022/0358772 A1    Nov. 10, 2022

(30) Foreign Application Priority Data
Feb. 14, 2020 (CN) .......................... 202010093209.2

(51) Int. Cl.
*G06V 20/70* (2022.01)
*G06V 10/82* (2022.01)
*G06V 20/10* (2022.01)

(52) U.S. Cl.
CPC .............. *G06V 20/70* (2022.01); *G06V 10/82* (2022.01); *G06V 20/188* (2022.01)

(58) Field of Classification Search
CPC ...... G06V 20/70; G06V 10/82; G06V 20/188; G06V 20/00; G06N 3/08; G06Q 50/02
See application file for complete search history.

(56) References Cited

U.S. PATENT DOCUMENTS 10,088,816 B1 *   10/2018   Anderson ............ G05B 19/042
2018/0012167 A1    1/2018   Colin et al.

FOREIGN PATENT DOCUMENTS

| CN | 102997907 | 3/2013 |
| CN | 104318240 | 1/2015 |

(Continued)

OTHER PUBLICATIONS

Du, Lei et al., "Design and implementation of panoramic map of ornamental plants in the south of Yudu Park", Industry and Technology Forum, with English abstract, Jun. 21, 2019, pp. 80-82, vol. 18, Issue 9.

(Continued)

*Primary Examiner* — Samir A Ahmed
(74) *Attorney, Agent, or Firm* — JCIP GLOBAL INC.

(57) ABSTRACT

The disclosure provides a plant blooming period broadcast method and system, and a computer-readable storage medium. The method comprises: receiving an image, and identifying a plant in the image to obtain the species of the plant; using a plant variety identification model corresponding to the species of the plant to identify the specific variety and blooming state of the plant; obtaining the photographing time and photographing position of the image, and determining the blooming period of the plant according to the photographing time and the blooming state; and marking the photographing position on a blooming period broadcast map as a viewing place of the plant, and correspondingly displaying the specific variety and blooming period of the plant.

15 Claims, 2 Drawing Sheets

(56) References Cited

FOREIGN PATENT DOCUMENTS

| | | |
|---|---|---|
| CN | 105022789 | 11/2015 |
| CN | 108647652 | 10/2018 |
| CN | 109146703 | 1/2019 |
| CN | 109147933 | 1/2019 |
| CN | 109447150 | 3/2019 |
| CN | 109544505 | 3/2019 |
| CN | 109815846 | 5/2019 |
| CN | 110363146 | 10/2019 |
| CN | 110378303 | 10/2019 |
| CN | 110555416 | 12/2019 |
| CN | 111291689 A * | 6/2020 |
| JP | 2008070557 | 3/2008 |
| WO | 2019237200 | 12/2019 |

OTHER PUBLICATIONS

L.G. Albrigo et al., "Flowering Expert System Development for a Phenology Based Citrus Decision Support System", Proc. 6th IS on Modelling in Fruit, Acta Hort. 584, ISHS 2002, Jul. 2002, pp. 247-254.
"Office Action of China Counterpart Application", issued on Mar. 20, 2023, p. 1-p. 9.
"Office Action of China Counterpart Application", issued on Sep. 28, 2023, p. 1-p. 7.
"Notice of allowance of China Counterpart Application", issued on Jan. 22, 2024, p. 1-p. 5.
"International Search Report (Form PCT/ISA/210) of PCT/CN2021/074752," mailed on Apr. 22, 2021, with English translation thereof, pp. 1-4.

* cited by examiner

PLANT BLOOMING PERIOD BROADCAST METHOD AND SYSTEM, AND COMPUTER-READABLE STORAGE MEDIUM

CROSS-REFERENCE TO RELATED APPLICATION

This application is a 371 of international application of PCT application serial no. PCT/CN2021/074752, filed on Feb. 2, 2021, which claims the priority benefit of China application no. 202010093209.2, filed on Feb. 14, 2020. The entirety of each of the above mentioned patent applications is hereby incorporated by reference herein and made a part of this specification.

FIELD OF THE DISCLOSURE

The disclosure relates to the technical field of artificial intelligence, in particular to a plant blooming period broadcast method and system, and a computer-readable storage medium.

DESCRIPTION OF RELATED ART

Nowadays, an increasing number of people like to go to outdoor places such as parks and botanical gardens and other places to enjoy plants, such as view cherry blossoms. However, normally people do not have the information about which plants are available for viewing around them, and it is also difficult to forecast the best period for viewing plants in various viewing locations. Therefore, the need for plant blooming period broadcast has been seen.

SUMMARY OF THE DISCLOSURE

The purpose of the disclosure is to provide a plant blooming period broadcast method and system, and a computer-readable storage medium, which can display information such as specific variety of plants currently available for viewing, viewing places, and blooming period. The specific technical solutions are as follows.

To achieve the above purpose, the disclosure provides a plant blooming period broadcast method, including:
  receiving an image is received, and identifying a plant in the image to obtain the species of the plant;
  using a plant variety identification model corresponding to the species of the plant to identify the specific variety and blooming state of the plant;
  obtaining a photographing time and a photographing position of the image, and determining a blooming period of the plant according to the photographing time and the blooming state;
  marking the photographing position on a blooming period broadcast map as a viewing place of the plant, and correspondingly displaying the specific variety and blooming period of the plant.

Optionally, the step of identifying the plant in the image to obtain the species of the plant includes:
  using a species identification model established by pre-training to identify the plant in the image to obtain the species of the plant, wherein the species identification model is a neural network model.

Optionally, the step of training the species identification model includes: obtaining a training sample set, wherein each sample in the training sample set is labeled with the species of the plant; obtaining a test sample set, wherein each sample in the test sample set is labeled with the species of the plant, wherein the test sample set is different from the training sample set; training the species identification model based on the training sample set; testing the species identification model based on the test sample set; wherein when the test result indicates that an identification accuracy rate of the species identification model is less than a preset accuracy rate, increasing the number of the samples in the training sample set for re-training; and when the test result indicates that the identification accuracy rate of the species identification model is greater than or equal to the preset accuracy rate, completing the training.

Optionally, the plant variety identification model is a neural network model.

Optionally, the blooming state includes: not blooming, first bloom, peak bloom, and withered.

Optionally, the plant blooming period broadcast method further includes:
  when the blooming state of the plant is first bloom or reaches peak bloom, pushing the viewing recommendation information of the plant to users in the area where the photographing position is located.

Optionally, the viewing recommendation information of the plant includes one or more of the following information: the specific variety and blooming period of the plant, and geographic location of the viewing place.

Optionally, the plant blooming period broadcast method further includes:
  when the blooming state of the plant reaches peak bloom, sharing the blooming period broadcast map with other users in a specific area, and the specific area is an area within a preset distance from the photographing position of the image.

Optionally, the plant blooming period broadcast method further includes:
  in response to the user's operation, displaying the blooming period broadcast map corresponding to the selected geographic area to the user, or displaying the blooming period broadcast map corresponding to all geographic areas to the user.

Optionally, the plant blooming period broadcast method further includes:
  in response to the user's operation of selecting one viewing place, displaying the specific variety and/or scenic spot information of the plants at the selected viewing place on the blooming period broadcast map.

Optionally, the plant blooming period broadcast method further includes:
  comparing the blooming period broadcast map with the previous blooming period broadcast map in historical records; if there is a viewing place that is not marked on the blooming period broadcast map in the previous blooming period broadcast map, marking the viewing place on the blooming period broadcast map, and then estimating the current blooming period of the plant based on the time of the last blooming period of the plant at the viewing place; and correspondingly displaying the specific variety and the current blooming period of the plant at the viewing place on the blooming period broadcast map.

Optionally, the plant blooming period broadcast method further includes:
  displaying a minimized icon of the target image at the viewing place on the blooming period broadcast map, wherein the target image is the image with the best blooming state of the plant photographed at the viewing place.

Optionally, the plant blooming period broadcast method further includes:

combining the received images of the plants photographed at the viewing place are combined into an image collection, wherein each image is sorted according to the photographing time and the blooming state;

in response to the user's operation, displaying the image collection to the user.

Based on the same concept of the disclosure, the disclosure further provides a plant blooming period broadcast system, wherein the system includes a processor and a memory, the memory stores commands, and when the commands are executed by the processor, the steps of the plant blooming period broadcast method are implemented, and the method includes: receiving an image, identifying a plant in the image to obtain the species of the plant; using the plant variety identification model corresponding to the species of the plant to identify the specific variety and blooming state of the plant; obtaining the photographing time and photographing position of the image, determining the blooming period of the plant according to the photographing time and the blooming state; marking the photographing position on the blooming period broadcast map as the viewing place of the plant, and correspondingly displaying the specific variety and the blooming period of the plant.

Based on the same concept of the disclosure, the disclosure further provides a computer-readable storage medium with commands stored therein, wherein when the commands are executed, the steps of the plant blooming period broadcast method are implemented, and the method includes: receiving an image, identifying a plant in the image to obtain the species of the plant; using the plant variety identification model corresponding to the species of the plant to identify the specific variety and blooming state of the plant; obtaining the photographing time and photographing position of the image, determining the blooming period of the plant according to the photographing time and the blooming state; marking the photographing position on the blooming period broadcast map as the viewing place of the plant, and correspondingly displaying the specific variety and the blooming period of the plant.

Compared with the current technology, the plant blooming period broadcast method and system and a computer-readable storage medium provided by the disclosure have the following advantages.

First the plant image uploaded by the user is received, and the plant in the image is identified to obtain the species of the plant. Then, the plant variety identification model corresponding to the species of the plant is used to identify the specific variety and blooming state of the plant; meanwhile, the photographing time and photographing position of the image are obtained, and the blooming period of the plant is determined according to the photographing time and the blooming state; finally, the photographing position is marked on the blooming period broadcast map as the viewing place of the plant, and the specific variety and blooming period of the plant are correspondingly displayed. The disclosure allows any user to upload images of plants, and determines the specific variety, blooming period, and photographing location of the plant according to the images of plants uploaded by the user, thereby updating and displaying the viewing place and specific variety as well as the blooming period of the plant on the blooming period broadcast map. In this manner, the blooming period broadcast map can promptly display relevant information about plants available for viewing in the current time period, thereby providing users with accurate reference information for viewing plants and improving the viewing experience of users.

BRIEF DESCRIPTION OF THE DRAWINGS

In order to explain the embodiments of the disclosure or the technical solutions in the conventional technology more clearly, the following will briefly describes the drawings that need to be used in the description of the embodiments or the conventionally technology. Clearly, the drawings in the following description are merely some of the embodiments of the disclosure. For those of ordinary skill in the art, other drawings may be obtained based on these drawings without inventive effort.

DESCRIPTION OF EMBODIMENTS

In the following, a plant blooming period broadcast method and system, and a computer-readable storage medium provided by the disclosure will be further described in detail with reference to the accompanying drawings and specific embodiments. According to the following description, the advantages and features of the disclosure will be clearer. It should be noted that the drawings all adopt a very simplified form and all are illustrated in imprecise scales, which only serve to conveniently and clearly assist in explaining the purpose of the embodiments of the disclosure. It should be noted that the structure, scale, size, etc. shown in the accompanying drawings in this specification are only used to match the content disclosed in the specification for the understanding and reading of those familiar with this technology, and are not intended to limit the implementation of the disclosure. Therefore, the structure, scale, size, etc. shown in the accompanying drawings do not possess any substantive technical significance. Any structural modification, proportional relationship change, or size adjustment should still fall within the scope of the disclosure without affecting the effects and purpose that can be achieved by the disclosure.

Figure 1:
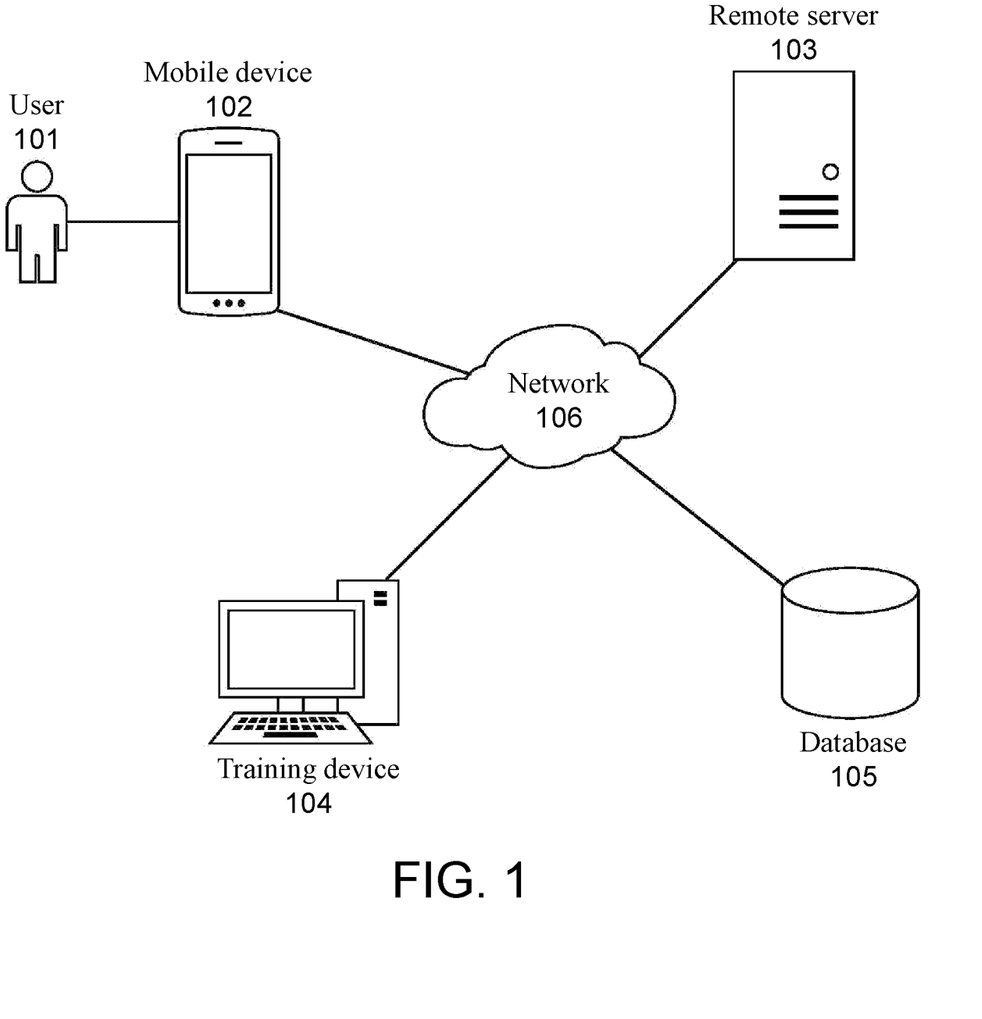
FIG. 1 is a schematic diagram of a network environment of a plant blooming period broadcast system according to an embodiment of the disclosure.

The inventors of the disclosure has conducted in-depth research on a plant blooming period broadcast method and system. FIG. 1 shows a schematic diagram of a network environment 100 of a plant blooming period broadcast system according to an embodiment of the disclosure.

The network environment 100 of the plant blooming period broadcast system may include a mobile device 102, a remote server 103, a training device 104, and a database 105, which are coupled to each other in a wired or wireless manner through the network 106. The network 106 can be embodied as a wide area network (such as a mobile phone network, a public switched telephone network, a satellite network, the Internet, etc.), a local area network (such as Wi-Fi, Wi-Max, ZigBee™, Bluetooth™, etc.) and/or networking function in other forms.

The mobile device 102 may include a mobile phone, a tablet computer, a laptop computer, a personal digital assistant, and/or other computing devices configured to capture, store, and/or transmit images such as digital photographs. Therefore, the mobile device 102 may include an image capture device such as a digital camera and/or may be configured to receive images from other devices. The mobile device 102 may include a display. The display may be configured to provide one or more user interfaces to the user 101, the user interface may include a plurality of interface elements, and the user 101 may interact with interface elements, and so on. For example, the user 101 can use the mobile device 102 to photograph a certain plant and upload or store the image. The mobile device 102 can output detailed introduction such as the category information, specific variety and blooming period, etc. of the plant to the user, or can display the blooming period broadcast map to the user, as well as push the viewing recommendation information of the plant, and prompt the user to share the blooming period of the plant with other users or friends.

The remote server 103 may be configured to analyze images and the like received from the mobile device 102 through the network 106 to determine the species of the plant, and to identify the specific variety and blooming state of the plant and other detailed information. The remote server 103 can also be configured to create and train the plant variety identification model and species identification model of this embodiment. The specific training process of the plant variety identification model and the species identification model will be described below in conjunction with specific embodiments.

The training device 104 may be coupled to the network 106 to facilitate the training of the plant variety identification model and the species identification model. The training device 104 may have multiple CPUs and/or GPUs to assist in training the plant variety identification model and the species identification model.

The database 105 can be coupled to the network 106 and provide data required by the remote server 103 for related calculations. For example, the database 105 may include a sample library storing a large number of images of plants of different species, and a sample library of images of plants of multiple varieties under the same species. In an embodiment, taking cherry blossoms as an example, the sample library may include a large number of image samples of different varieties of cherry blossoms at different locations, in different seasons, weather at different times, and captured at different photographing angles. In an embodiment, the selected plant photos taken by the user can further be stored in a sample library corresponding to the plant species. Meanwhile, physiological cycle information and morphological information corresponding to one or more of the location information, season information, time information, weather information and photographing angle information of the plant can further be recorded in the database. The database can be realized by various database technologies known in the art. The remote server 103 can access the database 105 to perform related operations as needed.

It should be understood that the network environment 100 herein is only an example. Those skilled in the art can add more devices or delete some devices as needed, and can modify the functions and configurations of some devices. In the following, the blooming period broadcast of cherry blossoms will be described as an example.

Figure 2:
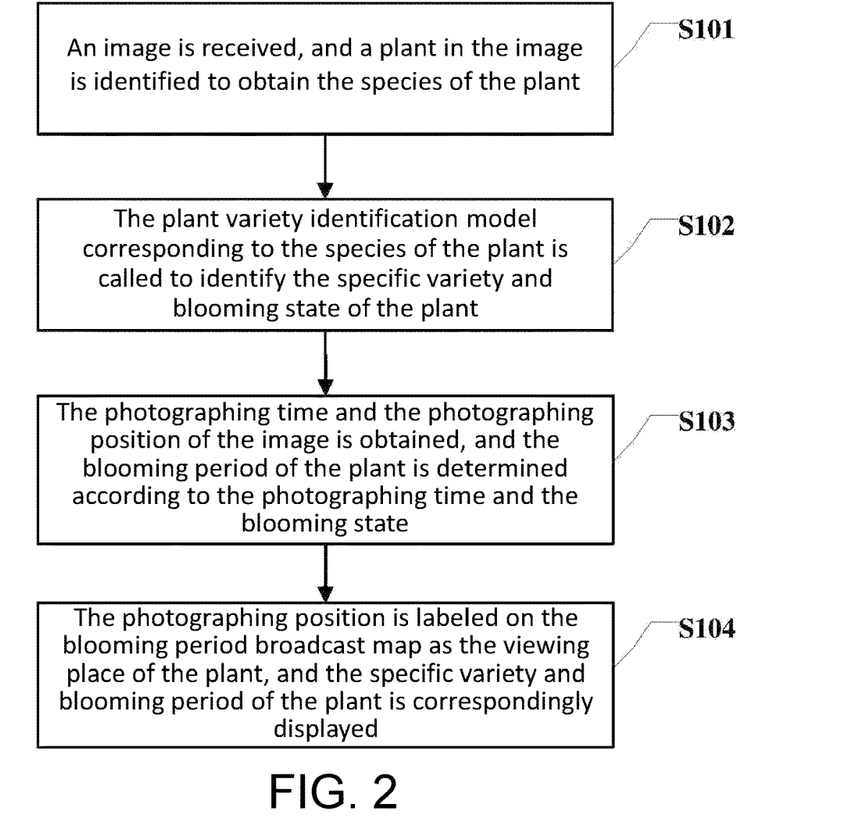
FIG. 2 is a schematic flowchart of a plant blooming period broadcast method according to an embodiment of the disclosure.

The following describes a plant blooming period broadcast method provided by an embodiment of the disclosure with reference to FIG. 2. As shown in FIG. 2, the plant blooming period broadcast method provided by an embodiment of the disclosure includes the following steps.

In step S101, an image is received, and a plant in the image is identified to obtain the species of the plant.

As mentioned above, the received image can be previously stored by the user or taken by the user in real time. For example, the image may be previously stored in the mobile device 102 by the user or captured by the user in real time by using an external camera connected to the mobile device 102 or a built-in camera of the mobile device 102. In an embodiment, the user can further obtain the image in real time through the Internet.

In an embodiment, a species identification model established by pre-training may be adopted to identify plants in the image to obtain species of the plants. The training step of the species identification model may include: step a, obtaining a training sample set, and each sample in the training sample set is labeled with species of plants; step b, obtaining a test sample set, and each sample in the test sample set is also labeled with species of plants, and the test sample set is different from the training sample set; step c, training the species identification model based on the training sample set; step d, testing the species identification model based on the test sample set; step e, when the test result indicates that the identification accuracy rate of the species identification model is less than a preset accuracy rate, increasing the number of samples in the training sample set for re-training; and step f, when the test result indicates that the identification accuracy rate of the species identification model is greater than or equal to the preset accuracy rate, completing the training.

For example, a certain number of image samples labeled with corresponding information is obtained for each plant species, and the number of image samples prepared for each plant species may be the same or different. The corresponding information labeled for each image sample may include plant species in the image sample (including scientific name, alias, category name of botanical classification, etc.). The image samples obtained for each plant species may include as much as possible the images of such plant species captured at different photographing angles, under different lighting conditions, different weathers (for example, the same plant may have different forms in sunny days and rainy days), in different months or seasons (for example, the form of the same plant may be different in different months or seasons), at different times (for example, the form of the same plant may be different every day in the morning and night), in different growth environments (for example, the same plant may grow differently in indoor and outdoor environments), and different geographical locations (for example, the same plant may grow differently in different geographic locations). In these conditions, the corresponding information labeled for each image sample may also include information such as the photographing angle, light irradiation, weather, season, time, growth environment, or geographic location of the image sample.

The image samples that have undergone the labeling processing can be divided into a training sample set for training the species identification model and a test sample set for testing the training result. Normally the number of samples in the training sample set is significantly greater than the number of samples in the test sample set. For example, the number of samples in the test sample set can account for 5% to 20% of the total number of image samples, and the number of samples in the corresponding training sample set can account for 80% to 95% of the total number of image samples. Those skilled in the art should understand that the number of samples in the training sample set and the test sample set can be adjusted as needed.

The training sample set can be used to train the species identification model, and the test sample set can be used to test the identification accuracy rate of the trained species identification model. If the identification accuracy rate does not meet the requirements, the number of image samples in the training sample set is increased, and the updated training sample set is used to retrain the species identification model until the identification accuracy rate of the trained species identification model meets the requirements. If the identification accuracy rate meets the requirements, the training is ended. In an embodiment, it can be determined whether the training can be ended based on whether the identification accuracy rate is less than the preset accuracy rate. In this way, a trained species identification model whose output accuracy rate meets the requirements can be used to identify plant species.

The species identification model is a neural network model, such as a deep convolutional neural network (CNN) or a deep residual network (Resnet). The deep convolutional neural network is a deep feedforward neural network, which uses the convolution kernel to scan the plant image, extracts the features to be identified in the plant image, and then identifies the plant features to be identified. In addition, in the process of identifying the plant image, the original plant image can be directly input into the deep convolutional neural network model without preprocessing the plant image. Compared with other identification models, the deep convolutional neural network model has higher identification accuracy rate and identification efficiency. Compared with the deep convolutional neural network model, the deep residual network model has an identity mapping layer added thereto. Therefore, when the network depth (the number of layers in the network) increases, the phenomenon that the accuracy rate is saturated or even decreased caused by convolutional neural network can be avoided. The identity mapping function of the identity mapping layer in the residual network model needs to satisfy: the sum of the input of the identity mapping function and the residual network model is equal to the output of the residual network model. After the introduction of identity mapping, the residual network model has more obvious changes in the output, so the identification accuracy rate and identification efficiency of plant physiological period identification can be significantly improved, thereby enhancing the identification accuracy rate and identification efficiency of plants.

In step S102, the plant variety identification model corresponding to the species of the plant is used to identify the specific variety and blooming state of the plant.

Since there are many varieties of ornamental plants such as cherry blossoms and plum blossoms, when viewing plants, users normally want to know the specific variety and blooming period of the ornamental plants, so that they can selectively go to the viewing place where their favorite variety is located. Accordingly, it is necessary to show the specific variety of plants to the user when the blooming period broadcast is performed. Since the above species identification model can only identify the species of plants, but cannot identify the specific variety of plants, in an embodiment of the disclosure, a corresponding plant variety identification model is pre-trained for different plant species. After the plant species is identified in step S101, the plant variety identification model corresponding to the plant species is used to perform identification again, so as to identify the specific variety of the plant in the image. Meanwhile, the blooming state of the plant can be identified as well. For example, if it is identified in step S101 that the plant is a cherry blossom, the pre-trained cherry blossom variety identification model is used to identify the image again to identify the specific variety and blooming state of the cherry blossom. The blooming state of a plant can be categorized according to the state of the flower bud and the blooming state of the whole plant. For example, the blooming state can be divided into four states: not blooming, first bloom, peak bloom, and withered. For example, if the plant has no buds or only a few buds, then the plant's blooming state is not blooming. When the plant has more flower buds or a few flower buds are open, the plant's blooming state is first bloom. If the proportion of blooming flowers of the whole plant exceeds a certain threshold (for example, 80%), the plant's blooming state reaches peak bloom. If the proportion of withered flowers of the plant exceeds a certain threshold (for example, 70%), the plant's blooming state is withered.

The training method of the plant variety identification model corresponding to various plant species is basically the same. Taking cherry blossom as an example, the training method of the cherry blossom variety identification model is briefly described below. There are many varieties of cherry blossoms, such as *Cerasus campanulata, Prunus lannesiana, Prunus* ×*yedoensis, Prunus speciosa*etc. The cherry blossoms of different varieties have their unique morphological characteristics. When training the cherry blossom variety identification model, a certain number of image samples labeled with corresponding information is obtained for various cherry blossom varieties. The number of image samples prepared for each cherry blossom can be the same or different, and the labeled information should include the cherry blossom variety and blooming state in the image sample. The image samples acquired for each cherry blossom variety can include as much as possible the images of such cherry blossom variety captured at different photographing angles, under different lighting conditions, different weathers (for example, the same plant may have different forms in sunny days and rainy days), in different months or seasons (for example, the form of the same plant may be different in different months or seasons), at different times (for example, the form of the same plant may be different every day in the morning and night), in different growth environments (for example, the same plant may grow differently in indoor and outdoor environments), and different geographical locations (for example, the same plant may grow differently in different geographic locations). In these conditions, the corresponding information labeled for each image sample may also include information such as the photographing angle, light irradiation, weather, season, time, growth environment, or geographic location of the image sample.

The cherry blossom variety identification model is also a neural network-based model, such as a deep convolutional neural network (CNN) or a deep residual network (Resnet). After acquiring the cherry blossom image samples, the cherry blossom variety identification model can be trained according to the above-mentioned training process of the species identification model, and no further description is incorporated herein.

The plant variety identification model can simultaneously identify the specific variety and blooming state of plants. In other embodiments of the disclosure, a plant variety identification model and a blooming state identification model can also be provided separately at the same time. The individual plant variety identification model is only used to identify the specific variety of plants, and the blooming state identification model is used to identify the blooming state of plants. It should be understandable that by setting the plant variety identification model and the blooming state identification model separately, the accuracy of variety identification and blooming state identification can be improved. When the blooming state identification model is used to identify the blooming state of plants in the image, the photographing position and the photographing time information of the image can be combined to perform a second confirmation on the identification result. For example, when the blooming state identification model identifies that the blooming state of a plant in an image reaches peak bloom, the photographing position of the image and the photographing time are combined. If it can be predicted that the blooming state of the same variety of plants at this photographing location should be in peak bloom during this photographing time, it can be determined that the identification result of the blooming state identification model is accurate. Otherwise, it can be considered that the identification result of the blooming state identification model might be wrong. In this manner, the blooming state of the plant in the image can be re-identified or directly manually identified. The blooming state identification model may be further trained again until the identification accuracy rate of the blooming state identification model meets the requirements. It can be obtained that the accuracy of the identification result of the blooming state identification model can be ensured through the second confirmation on the photographing position and the photographing time.

In step S103: the photographing time and the photographing position of the image are obtained, and the blooming period of the plant is determined according to the photographing time and the blooming state.

The photographing time and the photographing position of the image belong to the attribute information of the image. Therefore, the photographing time and the photographing position of the image can be obtained from the attribute information of the image. After the blooming state of the plant is identified, the blooming period of the plant can be determined according to the photographing time and the blooming state. The blooming period of the plant may include the blooming period of the first bloom and the blooming period of the peak bloom.

Taking cherry blossoms as an example, the photographing time of the image is Feb. 20, 2019, and the photographing location is location A. If the blooming state is not blooming, the blooming period information in historical records can be used to predict the blooming period of first boom and peak bloom of cherry blossoms at location A. For example, in the last blooming period, the cherry blossoms at the location A were first bloomed on Mar. 1, 2018, and the peak bloom was dated Mar. 15, 2018, then it can be predicted that the first blooming date of the cherry blossoms at the location A in this blooming period is Mar. 1, 2019, and the date of peak bloom is Mar. 15, 2019. If the blooming state is the first bloom, the photographing time can be used as the first blooming time of the cherry blossoms at location A. Then the blooming period of the cherry blossoms at the location A is predicted according to the blooming period of the first bloom. If the blooming state is in peak bloom, the photographing time is taken as the peak blooming period of the cherry blossoms at the location A.

In step S104: the photographing position is labeled on the blooming period broadcast map as the viewing place of the plant, and the specific variety and blooming period of the plant is correspondingly displayed.

In this embodiment, the display of the mobile device 102 provides a user interface to the user, and the blooming period broadcast map can be displayed on the user interface. The blooming period broadcast map can be used to display various viewing places of a specific plant species such as cherry blossoms, and can also display various viewing places of multiple plant species, such as cherry blossoms and peach blossoms, etc. simultaneously, the embodiment provides no limitation thereto.

Take the blooming period broadcast map that displays cherry blossoms separately as an example. In step S103, the photographing position of the image has been acquired, and the blooming period and specific variety of the cherry blossoms in the image have been acquired, then the photographing location can be labeled on the blooming period broadcast map as the viewing place of the cherry blossoms, and the specific variety and blooming period of the cherry blossoms are correspondingly displayed. For example, the photographing location is Park A, and Park A is labeled with a specific sign on the blooming period broadcast map, and the specific variety and blooming period of the cherry blossoms are displayed at the specific sign. In this way, the user can see from the blooming period broadcast map that the location corresponding to the photographing location has cherry blossoms available for viewing, and the specific variety and blooming period of the cherry blossoms at this location can also be understood.

Because the plant blooming period broadcast method provided by the embodiment of the disclosure allows any user to upload plant images, and determines the specific variety, blooming period, and photographing location of the plant based on the plant images uploaded by the user, thereby updating and displaying the viewing place and specific variety as well as the blooming period of the plant on the blooming period broadcast map. In this manner, the blooming period broadcast map can promptly display relevant information about plants available for viewing in the current time period, thereby providing users with accurate reference information for viewing plants and improving the viewing experience of users.

Optionally, in order to further improve user experience, the plant blooming period broadcast method of this embodiment may further include: when the blooming state of the plant is in the first bloom or in peak bloom, pushing viewing recommendation information of the plant to the users in the area where the photographing location is located. That is, if it is identified that the blooming state of the plant is in first bloom or in peak bloom, it means that the plant is currently in the best viewing time period. Under the circumstances, the remote server 103 can push viewing recommendation information of the plant to other users in the area where the photographing location is located, so as to prompt the other users in the area where the photographing location is located to go to the viewing place to view the plant. For example, the photographing location is a Park A, then the viewing recommendation information of the plant is pushed to the users currently located in the park A or nearby the park A. The viewing recommendation information of the plant includes one or more of the following information: specific variety, blooming period, geographic location of the viewing place, etc. of the plant. Certainly, the viewing recommendation information may also include other information, which is not limited in this embodiment. The way of pushing the viewing recommendation information may be in the form of short message, in-app message, or other forms, which is not limited in this embodiment.

Optionally, when the blooming state of the plant is in peak bloom, the blooming period broadcast map can also be shared with other users in a specific area, and the specific area is an area within a preset distance from the photographing position of the image. That is, the blooming period broadcast map can be shared with other users or friends in a specific area (for example, within 5 kilometers from the photographing location). The user uploads the photographed plant images, and labels the viewing place of the plant on the blooming period broadcast map according to the plant images. Thereafter, the user can choose to spontaneously share the blooming period broadcast map with other users or friends, so as to invite other users or friends to this viewing place to view the plants. Specifically, the blooming period broadcast map can be shared to other users in the application, or can be shared to other users through other social platforms. When sharing, the blooming period broadcast map may be processed and shared in the form of images, or the blooming period broadcast map may be processed into an H5 page for sharing, which is not limited in this embodiment.

Optionally, the user can click to view the recommended plant viewing place in the current time period. Generally speaking, the viewing places of plants are normally in a park, botanical garden and other scenic spots. When the user selects a certain viewing place, the mobile device 102 can display the specific variety and/or scenic spot information of the plants at the selected viewing place on the blooming period broadcast map in response to the user's operation of selecting the viewing place, such as introduction of scenic spot, traffic information, flow of people, ticket information, and other fee information, in order to provide users with more information about the viewing place of the plants.

In some embodiments, the user wishes to view the blooming conditions of the plant in a certain area or all areas, and the mobile device 102 can, in response to the user's operation, display the blooming period broadcast map corresponding to the selected geographic area to the user, or display the blooming period broadcast map corresponding to all geographic areas to the user. For example, if the user chooses to view the blooming status of the plant in the Beijing area, the mobile device 102 will display the blooming period broadcast map of the Beijing area to the user. When the user chooses to view the blooming status of the plant in all areas of China, the mobile device 102 will display the blooming period broadcast map covering all areas of China to the user.

In addition, in the plant blooming period broadcast method provided by this embodiment, in order to label all the places available for viewing of the plant, and provide users with comprehensive viewing information, the blooming period broadcast map can be compared with the previous blooming period broadcast map in historical records. If there is a viewing place that is not labeled on the blooming period broadcast map in the previous blooming period broadcast map, the viewing place will be labeled on the blooming period broadcast map, and the current blooming period of the plant is estimated based on the time of the last blooming period of the plant at the viewing place. Meanwhile, the specific variety and the current blooming period of the plant at the viewing place are correspondingly displayed on the blooming period broadcast map. For example, three viewing places of the plant have been labeled on the current blooming period broadcast map, and the three viewing places are locations A, B, and C, and there are four viewing places of the plant labeled on the blooming period broadcast map of the last blooming period, namely locations A, B, C, and D. By comparing these two blooming period broadcast maps, it is found that location D is not labeled, and the location D was labeled in the last blooming period, which indicates that the plant is also present at the location D (because no user has taken a plant image at the location D and uploaded it in the current blooming period, the location D cannot be labeled on the blooming period broadcast map in the current blooming period). Accordingly, in the current blooming period, the location D is also labeled on the blooming period broadcast map as the viewing place, and the specific variety of the plants and the specific time of the blooming period at the location D in the last blooming period are obtained. Meanwhile, the time of current blooming period is estimated based on the time of the last blooming period, so that the specific variety of the plant and the current blooming period at the location D are correspondingly displayed on the broadcast map of the current blooming period. In this way, the blooming period information in historical records can be used to update the viewing place on the blooming period broadcast map of the current blooming period, so as to make up for the shortcoming of labeling the viewing place by uploading plant images by the user.

Optionally, a minimized icon of the target image may be further displayed at the viewing place on the blooming period broadcast map, and the target image is the image with the best blooming state of the plant photographed at the viewing place. Specifically, the most recently taken image (for example, within 24 hours) with the best blooming state of the plant may be used as the minimized icon corresponding to the viewing place. The image with the best blooming state, for example, can be selected from images in which over 80% of the flowers of the whole plant are blooming, and also can be selected from images in which the flowers occupy the most area of the image, or the image with the best blooming state is identified through the blooming state identification model.

In other embodiments, the received images of the plants taken at the same viewing place may also be grouped into an image collection. The images in the image collection may be taken by the same user or may include images taken by other users, and each image can be sorted comprehensively according to photographing time and blooming state. When the user chooses to view the image collection (for example, by clicking the above-mentioned minimized icon), the image collection is displayed to the user, so that the user can view the blooming state of the plant at the viewing place.

Figure 3:
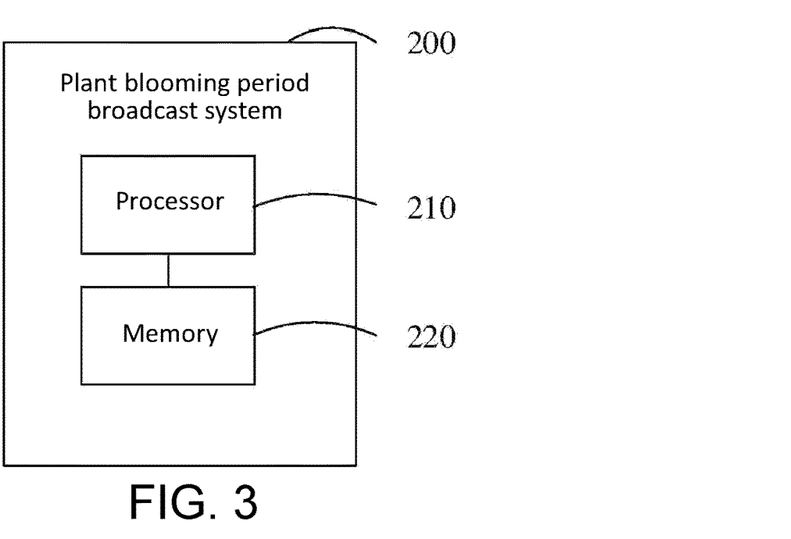
FIG. 3 is a schematic structural diagram of a plant blooming period broadcast system provided by an embodiment of the disclosure.

Based on the same concept of the disclosure, the disclosure further provides a plant blooming period broadcast system. As shown in FIG. 3, the plant blooming period broadcast system 200 may include a processor 210 and a memory 220. The memory 220 stores commands. When the commands are executed by the processor 210, the steps in the plant blooming period broadcast method as described above can be implemented.

The processor 210 can perform various operations and processing according to commands stored in the memory 220. Specifically, the processor 210 may be an integrated circuit chip with signal processing capability. The processor can be a general-purpose processor, a digital signal processor (DSP), an application-specific integrated circuit (ASIC), a field programmable gate array (FPGA) or other programmable logic devices, discrete gates or transistor logic devices, and discrete hardware components, which are capable of implementing or executing various methods, steps, and logical block diagrams disclosed in the embodiments of the disclosure. The general-purpose processor may be a microprocessor or the processor may also be any conventional processor, etc., and may have an X86 architecture or an ARM architecture.

The memory 220 stores executable commands, and when the commands are executed by the processor 210, the above-mentioned plant blooming period broadcast method is implemented. The memory 220 may be a volatile memory or a non-volatile memory, or may include a volatile memory and a non-volatile memory both. The non-volatile memory can be read-only memory (ROM), programmable read-only memory (PROM), erasable programmable read-only memory (EPROM), electrically erasable programmable read-only memory (EEPROM), or flash memory. The volatile memory may be random access memory (RAM), which is used as external cache memory. By way of exemplary but not restrictive description, many forms of RAM can be adopted, such as static random access memory (SRAM), dynamic random access memory (DRAM), synchronous dynamic random access memory (SDRAM), double data rate synchronous dynamic random access memory (DDRS-DRAM), enhanced synchronous dynamic random access memory (ESDRAM), synchronous connection dynamic random access memory (SLDRAM), and direct memory bus random access memory (DRRAM). It should be noted that the memory of the method described herein is intended to include, but is not limited to, these and any other suitable types of memory.

The memory 220 stores executable commands, and the commands are in the above-mentioned plant blooming period broadcast method executed by the processor 210. The memory 220 may be a volatile memory or a non-volatile memory, or may include a volatile memory and a non-volatile memory both. The non-volatile memory can be read-only memory (ROM), programmable read-only memory (PROM), erasable programmable read-only memory (EPROM), electrically erasable programmable read-only memory (EEPROM), or flash memory. The volatile memory may be random access memory (RAM), which is used as external cache memory. By way of exemplary but not restrictive description, many forms of RAM can be adopted, such as static random access memory (SRAM), dynamic random access memory (DRAM), synchronous dynamic random access memory (SDRAM), double data rate synchronous dynamic random access memory (DDRS-DRAM), enhanced synchronous dynamic random access memory (ESDRAM), synchronous connection dynamic random access memory (SLDRAM), and direct memory bus random access memory (DRRAM). It should be noted that the memory of the method described herein is intended to include, but is not limited to, these and any other suitable types of memory.

Based on the same concept of the disclosure, the disclosure further provides a computer-readable storage medium with commands stored therein. When the commands are executed, the steps in the plant blooming period broadcast method described above can be implemented.

Similarly, the computer-readable storage medium in the embodiments of the disclosure may be a volatile memory or a non-volatile memory, or may include a volatile memory and a non-volatile memory both. It should be noted that the computer-readable storage medium described herein are intended to include, but are not limited to, these and any other suitable types of memory.

It should be noted that the flowcharts and block diagrams in the drawings illustrate the architecture, functions, and operations of the system, method, and computer program product that can be possibly implemented according to various embodiments of the disclosure. In this regard, each block in the flowchart or block diagram may represent a module, program segment, or part of the code, and the module, program segment, or part of the code includes one or more executable commands for realizing the specified logic function. It should also be noted that, in some alternative implementations, the functions marked in the block may also occur in a different order other than the order marked in the drawings. For example, two blocks shown in succession can actually be executed substantially in parallel, and they can sometimes be executed in a reverse order, depending on the functions involved. It should also be noted that each block in the block diagram and/or flowchart, as well as the combination of blocks in the block diagram and/or flowchart, can be implemented by using a special hardware-based system that performs specified functions or operations, or can be implemented by using the combination of a special hardware or computer commands.

Generally speaking, the various exemplary embodiments of the disclosure may be implemented in hardware or special circuits, software, firmware, logic, or any combination thereof. Some aspects of the embodiments can be implemented in hardware, while other aspects of the embodiments can be implemented in firmware or software that can be executed by a controller, microprocessor, or other computing devices. When various aspects of the embodiments of the disclosure are illustrated or described as block diagrams, flowcharts, or represented by some other graphics, it should be construed that the blocks, devices, systems, techniques, or methods described herein can be regarded as non-limiting examples that are implemented in hardware, software, firmware, special circuits or logic, general-purpose hardware or controllers or other computing devices, or some combination thereof.

It should be noted that the various embodiments in this specification are described in a related manner, and the same or similar parts of the various embodiments can serve as cross-reference for each other. Each embodiment focuses on the differences from other embodiments. In particular, for the system and the computer-readable storage medium, since they are basically similar to the method embodiment, the related description is relatively simple, and for related parts, please refer to the part of the description of the method embodiment.

In this disclosure, relational terms such as first and second are only used to distinguish one object or operation from another object or operation, and do not necessarily require or imply the presence of any such actual relation or order between the objects or operations. Moreover, the terms "include", "comprise" or any other variants thereof are intended to cover non-exclusive inclusion, so that a process, method, article or device including a series of elements not only includes those elements, but also includes those that are not explicitly listed, or also include elements inherent to this process, method, article or equipment. If there are no further restrictions, the element defined by the sentence "including a . . . " does not exclude the presence of other identical elements in the process, method, article, or equipment that includes the element.

The foregoing description is only a description of the preferred embodiments of the disclosure and does not limit the scope of the disclosure in any way. Any changes or modifications made by persons of ordinary skill in the field of the disclosure based on the foregoing disclosure shall fall within the scope to be protected by the claims.

What is claimed is:

1. A plant blooming period broadcast method, characterized by comprising:
receiving an image of a plant, and identifying the plant in the image to obtain a species of the plant;
using a plant variety identification model corresponding to the species of the plant to identify a specific variety and a blooming state of the plant;

obtaining a photographing time and a photographing position of the image, and determining a blooming period of the plant according to the photographing time of the image and the blooming state of the plant;

marking the photographing position of the image on a blooming period broadcast map as a viewing place of the plant, and correspondingly displaying the specific variety and the blooming period of the plant.

2. The plant blooming period broadcast method according to claim 1, wherein identifying the plant in the image to obtain the species of the plant comprises:

using a species identification model established by pre-training to identify the plant in the image to obtain the species of the plant, wherein the species identification model is a neural network model.

3. The plant blooming period broadcast method according to claim 2, wherein step of training the species identification model comprises:

obtaining a training sample set, wherein each sample in the training sample set is labeled with the species of the plant;

obtaining a test sample set, wherein each sample in the test sample set is labeled with the species of the plant, wherein the test sample set is different from the training sample set;

training the species identification model based on the training sample set;

testing the species identification model based on the test sample set;

wherein when [the]]a test result indicates that an identification accuracy rate of the species identification model is less than a preset accuracy rate, increasing a number of samples in the training sample set for re-training; and when the test result indicates that the identification accuracy rate of the species identification model is greater than or equal to the preset accuracy rate, completing the training.

4. The plant blooming period broadcast method according to claim 1, wherein the plant variety identification model is a neural network model.

5. The plant blooming period broadcast method according to claim 1, wherein the blooming state of the plant comprises: not blooming, first bloom, peak bloom, and withered.

6. The plant blooming period broadcast method according to claim 5, further comprising:

when the blooming state of the plant is the first bloom or reaches the peak bloom, pushing viewing recommendation information of the plant to users in an area where the photographing position is located.

7. The plant blooming period broadcast method according to claim 6, wherein the viewing recommendation information of the plant comprises one or more of following information: the specific variety and the blooming period of the plant, and a geographic location of the viewing place.

8. The plant blooming period broadcast method according to claim 5, further comprising:

when the blooming state of the plant reaches the peak bloom, sharing the blooming period broadcast map with other users in a specific area, wherein the specific area is an area within a preset distance from the photographing position of the image.

9. The plant blooming period broadcast method according to claim 1, further comprising:

in response to a user's operation, displaying the blooming period broadcast map corresponding to a selected geographic area to the user, or displaying the blooming period broadcast map corresponding to all the geographic areas to the user.

10. The plant blooming period broadcast method according to claim 1, further comprising:

in response to a user's operation of selecting one viewing place, displaying at least one of the specific variety and[/or]] scenic spot information of the plant at the selected viewing place on the blooming period broadcast map.

11. The plant blooming period broadcast method according to claim 1, further comprising:

comparing the blooming period broadcast map with a previous blooming period broadcast map in historical records, if there is a viewing place that is not marked on the blooming period broadcast map in the previous blooming period broadcast map, marking the viewing place on the blooming period broadcast map, and estimating a current blooming period of the plant based on a time of a last blooming period of the plant at the viewing place, and correspondingly displaying the specific variety and the current blooming period of the plant at the viewing place on the blooming period broadcast map.

12. The plant blooming period broadcast method according to claim 1, further comprising:

displaying a minimized icon of a target image at the viewing place on the blooming period broadcast map, wherein the target image is the image with the best blooming state of the plant photographed at the viewing place.

13. The plant blooming period broadcast method according to claim 1, further comprising:

combining the received images of the plant photographed at the viewing place into an image collection, wherein each of the images is sorted according to the photographing time and the blooming state;

in response to a user's operation, displaying the image collection to the user.

14. A plant blooming period broadcast system, wherein the system comprises a processor and a memory, the memory stores commands, and when the commands are executed by the processor, steps of the method claimed in claim 1 are implemented.

15. A non-transitory computer-readable storage medium with commands stored therein, wherein when the commands are executed, steps of the method claimed in claim 1 are implemented.

* * * * *